United States Patent
Lundby

(10) Patent No.: US 6,856,604 B2
(45) Date of Patent: Feb. 15, 2005

(54) EFFICIENT MULTI-CAST BROADCASTING FOR PACKET DATA SYSTEMS

(75) Inventor: Stein A. Lundby, Solana Beach, CA (US)

(73) Assignee: Qualcomm Incorporated, San Diego, CA (US)

(*) Notice: Subject to any disclaimer, the term of this patent is extended or adjusted under 35 U.S.C. 154(b) by 196 days.

(21) Appl. No.: 10/029,711

(22) Filed: Dec. 19, 2001

(65) Prior Publication Data

US 2003/0112778 A1 Jun. 19, 2003

(51) Int. Cl.[7] .................. H04B 7/216; H04B 17/00; H04J 13/00; H04H 1/00
(52) U.S. Cl. .................. 370/312; 370/390; 370/252; 455/67.14
(58) Field of Search .................. 370/229, 252, 370/312, 335, 342, 390, 441, 468; 455/67.11, 67.14, 135, 452.1

(56) References Cited

U.S. PATENT DOCUMENTS

| | | | |
|---|---|---|---|
| 4,901,307 A | | 2/1990 | Gilhousen et al. |
| 5,103,459 A | | 4/1992 | Gilhousen et al. |
| 5,887,252 A | * | 3/1999 | Noneman .................. 455/463 |
| 5,920,701 A | | 7/1999 | Miller et al. |
| 5,995,496 A | * | 11/1999 | Honkasalo et al. ......... 370/318 |
| 6,188,767 B1 | | 2/2001 | Needham et al. |
| 6,333,921 B1 | * | 12/2001 | Grube et al. ............... 370/312 |
| 6,360,076 B1 | * | 3/2002 | Segura et al. ............. 455/67.11 |
| 6,393,008 B1 | * | 5/2002 | Cheng et al. ............... 370/338 |
| 6,522,650 B1 | * | 2/2003 | Yonge et al. .............. 370/390 |
| 6,542,491 B1 | * | 4/2003 | Tari et al. ................. 370/338 |
| 2002/0003798 A1 | * | 1/2002 | Sato et al. ................. 370/390 |
| 2002/0142780 A1 | * | 10/2002 | Airy et al. ................ 455/452 |

FOREIGN PATENT DOCUMENTS

| | | |
|---|---|---|
| EP | 0999656 A1 | 5/2000 |
| EP | 1143635 A1 | 10/2001 |
| WO | 0126397 A1 | 4/2001 |

* cited by examiner

Primary Examiner—John Pezzlo
Assistant Examiner—Ahmed Elallam
(74) Attorney, Agent, or Firm—Philip R. Wadsworth; Thien Nguyen; Erin Madill

(57) ABSTRACT

Methods and apparatus are presented for efficient broadcasting in wireless packet data systems. A single MAC_ID is used for broadcasting to a group of subscribers. By using the channel quality information of the group of subscribers, a base station determines the identity of the subscriber with the worst channel conditions. The timing and the transmission format of the multi-cast are then tailored so that the subscriber with the worst channel conditions is capable of recovering the transmission. If the timing and the transmission format is chosen in relation to subscriber with the worst channel conditions, it is probable that other subscribers will be able to recover the transmission as well. Hence, only a single MAC_ID need to be used to make a single broadcast, rather than sending multiple transmissions to multiple subscribers.

29 Claims, 2 Drawing Sheets

EFFICIENT MULTI-CAST BROADCASTING FOR PACKET DATA SYSTEMS

BACKGROUND

1. Field

The present invention relates generally to communications, and more specifically, to transmitting multi-cast broadcasts in wireless communication systems.

2. Background

The field of wireless communications has many applications including, e.g., cordless telephones, paging, wireless local loops, personal digital assistants (PDAs), Internet telephony, and satellite communication systems. A particularly important application is cellular telephone systems for mobile subscribers. As used herein, the term "cellular" system encompasses both cellular and personal communications services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA and 3GPP2. Another CDMA standard is the W-CDMA standard, as embodied in $3^{rd}$ Generation Partnership Project "3 GPP", Document Nos. 3G TS 25.211, 3G TS 25.212, 3G TS 25.213, and 3G TS 25.214.

The telecommunication standards cited above are examples of some of the various communications systems that can be implemented to transmit voice and/or data. Within these systems, multiple users must share limited system resources. One such limitation is the availability of channels to support multiple users. For example, in a CDMA-type system, each user within the range of a base station is assigned one or more channels to conduct communications with the base station. If there were not enough channels, then a new user that is entering the range of the base station would be blocked from accessing the services of that base station.

In certain situations, it is desirable to transmit the same data to several users. This is particularly desirable for applications that incur a large load on the wireless network, such as video streaming. However, cellular base stations are presently configured to transmit the data on separate channels to each user, regardless of the similarity of the data to each user. Hence, it could be said that the base station is wasting channel resources every time the base station makes multiple transmissions with the same data content. There is a present need in the art for a method and apparatus for transmitting identical or similar data to multiple users without using multiple channels.

SUMMARY

The methods and apparatus presented herein address the above needs. In one aspect, an apparatus is presented for multi-cast transmissions that minimize channel resources, the apparatus comprising: a memory element; and a processing element for executing a set of instructions stored in the memory element, the set of instructions for: generating an identifier for a group of subscribers, wherein the identifier is for accessing a multi-cast service; using channel quality information for at least one subscriber to determine the timing of the multi-cast service to the group of subscribers; and transmitting the identifier and the multi-cast service on at least one channel, wherein the multi-cast service is transmitted in accordance with the timing determined by the channel quality information.

In another aspect, another apparatus is presented for generating an identifier for a group of subscribers, wherein the identifier is for accessing a multi-cast service; for using channel quality information for at least one subscriber to determine the transmission format of the multi-cast service to the group of subscribers; and for transmitting the identifier and the multi-cast service on at least one channel, wherein the multi-cast service is transmitted in accordance with the transmission format determined by the channel quality information.

In anther aspect, a method is presented for determining the channel quality information for a plurality of subscribers; for identifying the subscriber with the worst channel conditions; for scrambling a multi-cast service using a scrambling code known to the plurality of subscribers; and for transmitting the scrambled multi-cast service to the plurality of subscribers, wherein the scrambled multi-cast service is transmitted in accordance with a transmission format that is optimal for the subscriber with the worst channel conditions.

In another aspect, a method is presented for generating an identifier for a group of subscribers, wherein the identifier is for accessing a multi-cast service; for identifying the subscriber with the worst channel quality by analyzing a plurality of channel quality feedback indicators from a group of subscribers; for selecting a timing and a transmission format of the multi-cast service so that the multi-cast service will be received by the subscriber with the worst channel conditions; and for transmitting the identifier on a first channel and the multi-cast service on a second channel in accordance with the timing and the transmission format as determined by the subscriber with the worst channel quality.

DETAILED DESCRIPTION

Figure 1:
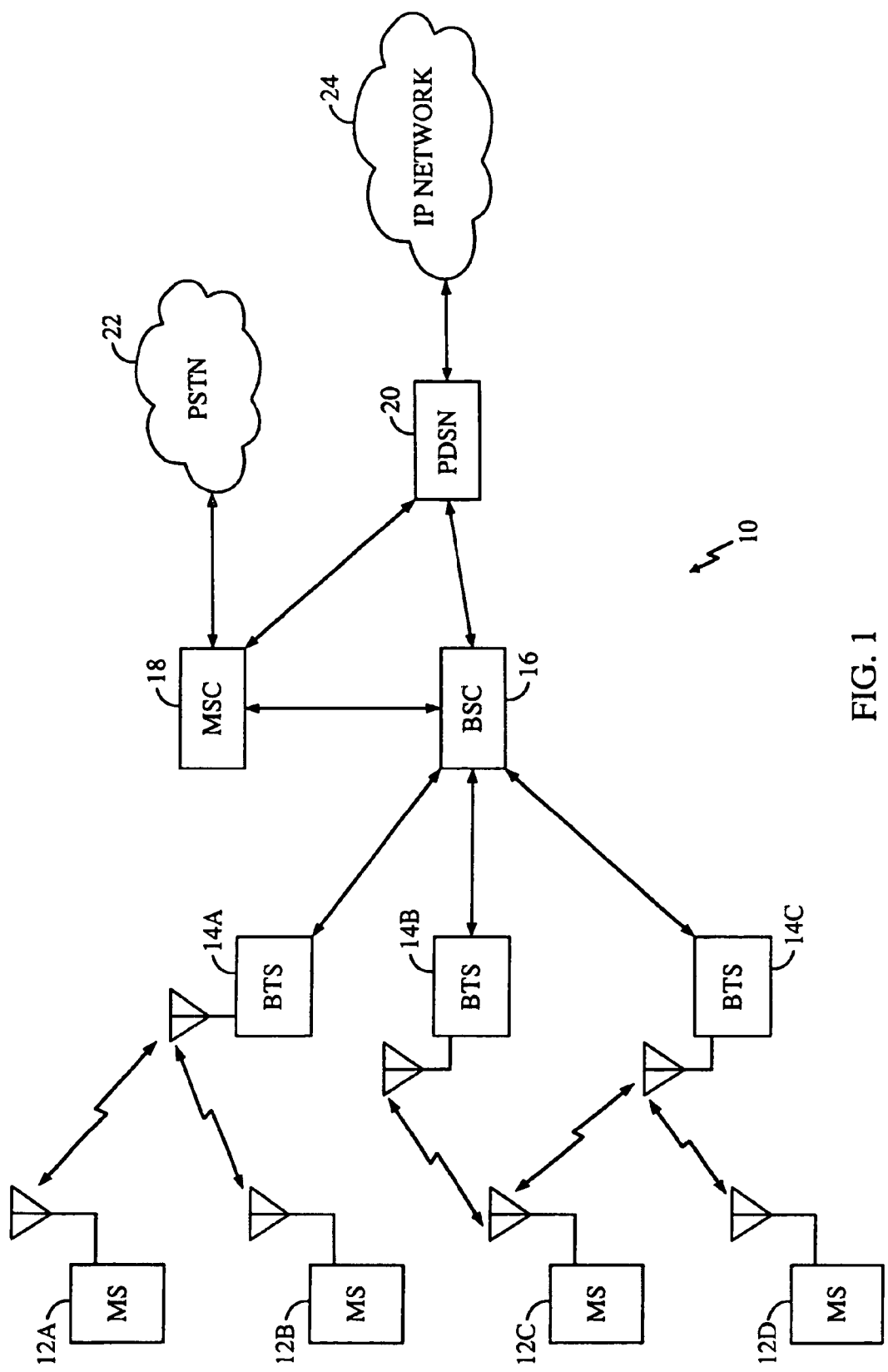
FIG. 1 is a diagram of a wireless communication network.

As illustrated in FIG. 1, a wireless communication network 10 generally includes a plurality of mobile stations (also called subscriber units or user equipment or remote stations) 12a–12d, a plurality of base stations (also called base station transceivers (BTSs) or Node B). 14a–14c, a base station controller (BSC) (also called radio network controller or packet control function 16), a mobile switching center (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four mobile stations 12a–12d, three base stations 14a–14c, one BSC 16, one MSC 18, and one PDSN 20 are shown. It would be understood by those skilled in the art that there could be any number of mobile stations 12, base stations 14, BSCs 16, MSCs 18, and PDSNs 20.

In one embodiment the wireless communication network 10 is a packet data services network. The mobile stations 12a–12d may be any of a number of different types of wireless communication device such as a portable phone, a cellular telephone that is connected to a laptop computer running IP-based, Web-browser applications, a cellular telephone with associated hands-free car kits, a personal data assistant (PDA) running IP-based, Web-browser applications, a wireless communication module incorporated into a portable computer, or a fixed location communication module such as might be found in a wireless local loop or meter reading system. In the most general embodiment, mobile stations may be any type of communication unit. The mobile stations 12a–12d may advantageously be configured to perform one or more wireless packet data protocols such as described in, for example, the EIA/TIA/IS-707 standard.

In one embodiment the IP network 24 is coupled to the PDSN 20, the PDSN 20 is coupled to the MSC 18, the MSC is coupled to the BSC 16 and the PSTN 22, and the BSC 16 is coupled to the base stations 14a–14c via wirelines configured for transmission of voice and/or data packets in accordance with any of several known protocols including, e.g., E1, T1, Asynchronous Transfer Mode (ATM), IP, PPP, Frame Relay, HDSL, ADSL, or xDSL. In an alternate embodiment, the BSC 16 is coupled directly to the PDSN 20, and the MSC 18 is not coupled to the PDSN 20.

During typical operation of the wireless communication network 10, the base stations 14a–14c receive and demodulate sets of reverse signals from various mobile stations 12a–12d engaged in telephone calls, Web browsing, or other data communications. Each reverse signal received by a given base stations 14a–14c is processed within that base station 14a–14c. Each base stations 14a–14c may communicate with a plurality of mobile stations 12a–12d by modulating and transmitting sets of forward signals to the mobile stations 12a–12d. For example, as shown in FIG. 1, the base station 14a communicates with first and second mobile stations 12a, 12b simultaneously, and the base station 14c communicates with third and fourth mobile stations 12c, 12d simultaneously.

BSC 16 provides call resource allocation and mobility management functionality including the orchestration of soft handoffs of a call for a particular mobile stations 12a–12d from one base stations 14a–14c to another base station 14a–14c. For example, a mobile station 12c is communicating with two base stations 14b, 14c simultaneously. Eventually, when the mobile station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

In some communication systems, packets carrying data traffic are divided into subpackets, which occupy slots of a transmission channel. For illustrative ease only, the nomenclature of a cdma2000 system is used herein. Such use is not intended to limit the implementation of the embodiments herein to cdma2000 systems. Embodiments can be implemented in other systems, such as, e.g., WCDMA, without affecting the scope of the embodiments described herein.

The forward link from the base station to a remote station operating within the range of the base station can comprise a plurality of channels. Some of the channels of the forward link can include, but are not limited to a pilot channel, synchronization channel, paging channel, quick paging channel, broadcast channel, power control channel, assignment channel, control channel, dedicated control channel, medium access control (MAC) channel, fundamental channel, supplemental channel, supplemental code channel, and packet data channel. The reverse link from a remote station to a base station also comprises a plurality of channels. Each channel carries different types of information to the target destination. Typically, voice traffic is carried on fundamental channels, and data traffic is carried on supplemental channels or packet data channels. Supplemental channels are usually dedicated channels, while packet data channels usually carry signals that are designated for different parties in a time and code-multiplexed manner. Alternatively, packet data channels are also described as shared supplemental channels. For the purposes of describing the embodiments herein, the supplemental channels and the packet data channels are generically referred to as data traffic channels.

Voice traffic and data traffic are typically encoded, modulated, and spread before transmission on either the forward or reverse links. The encoding, modulation, and spreading can be implemented in a variety of formats. In a CDMA system, the transmission format ultimately depends upon the type of channel over which the voice traffic and data traffic are being transmitted and the condition of the channel, which can be described in terms of fading and interference.

Packet data systems traditionally transmit data to remote stations, from one to ten stations at a time. Data transmission occurs from a base station on a shared data traffic channel, which is accompanied by control information. The control information can comprise parameters of the data transmission, such as modulation, coding, and power, which are adjusted by the base station using channel quality feedback (CQF) information about the remote station. CQF information is used to maximize the system throughput, minimize channel usage, and maximize the likelihood that a data transmission will reach the remote station with a reasonable quality. The CQF can be explicit through a transmission from the remote station or the CQF can be derived by the base station through transmission power levels. The base station transmits the control information in order to aid the remote station in decoding the associated data transmission.

One piece of control information that is transmitted to the remote station is a medium access control identifier (MAC_

ID). MAC_IDs are assigned to remote stations in accordance with a unique International Mobile Station Identify (IMSI) when the remote stations enter the communication system. Hence, the channel that is dedicated to the remote station can be identified by the MAC_ID that is assigned to the remote station.

Some packet data systems offer services such as multi-cast and broadcast. In a multi-cast, the same transmissions are sent to a group of remote stations. In a broadcast, the same transmissions are sent to all remote stations in the range of the base station. For example, a video broadcast would require the system to transmit the video stream to all users subscribed to the video streaming channel. However, as mentioned above, packet data systems are configured to transmit data to only one remote station at a time. Hence, multi-cast and broadcast in current packet data systems requires an independent transmission of the same data to each remote station. If N remote stations were present in the system and the system needed to broadcast the same message to all of the remote stations, then the system would transmit the same information N times, each transmission tailored to the needs of each remote station.

The same information is sent independently to each remote station because a transmission to each remote station would propagate through different channel conditions. The condition of each channel will vary in accordance to distance to the base station, fading, and interference from other channels. In order to ensure delivery of the information within a desired quality level, such as a frame error rate (FER) of less than 1%, the various transmission parameters can be adjusted. As a simplistic example, if the channel conditions were bad, then the base station would transmit information to a remote station using a format where data symbols are repeated often in the packet. Hence, the receiving party could soft-combine any corrupted data symbols to attain the original information. However, if the channel conditions are good, then the base station could transmit information to a remote station using a format that does not repeat data symbols, since the receiving party is likely to receive the uncorrupted data symbols. Hence, although the same information is being carried to the remote stations, the transmission formats of the data packets to each remote station can be different.

An example of the different transmission parameters at different rates that can be used by a communication network is shown in Table 1.

TABLE 1

Forward Link Modulation Parameters

| Data Rate (kbps) | Number of Slots | Bits per Packet | Code Rate | Modulation |
|---|---|---|---|---|
| 38.4 | 16 | 1024 | 1/5 | QPSK |
| 76.8 | 8 | 1024 | 1/5 | QPSK |
| 153.6 | 4 | 1024 | 1/5 | QPSK |
| 307.2 | 2 | 1024 | 1/5 | QPSK |
| 614.4 | 1 | 1024 | 1/3 | QPSK |
| 307.2 | 4 | 2048 | 1/3 | QPSK |
| 614.4 | 2 | 2048 | 1/3 | QPSK |
| 1228.8 | 1 | 2048 | 2/3 | QPSK |
| 921.6 | 2 | 3072 | 1/3 | 8-PSK |
| 1843.2 | 1 | 3072 | 2/3 | 8-PSK |
| 1228.8 | 2 | 4096 | 1/3 | 16-QAM |
| 2457.6 | 1 | 4096 | 2/3 | 16-QAM |

It should be noted that Table 1 is merely an illustrative example of just some of the transmission parameters that can be different for a transmission to one subscriber versus a transmission to other subscribers. Other parameters, such as symbol repetition and transmission duration over multiple frames, are not shown.

The present embodiments are directed towards eliminating the waste of channel resources resulting from the multiplicity of identical broadcasts to multiple recipients. In one embodiment, the base station generates a special MAC_ID value that identifies a group of remote stations, rather than a single remote station. For each multi-cast service available, a corresponding special MAC_ID value is also generated. For example, MAC_ID 00203 could be reserved for the video streaming of a television channel. Remote stations wishing to receive the television channel via the communications system would subscribe to this service, and watch for MAC_ID 00203 in the control signaling information.

Figure 2:
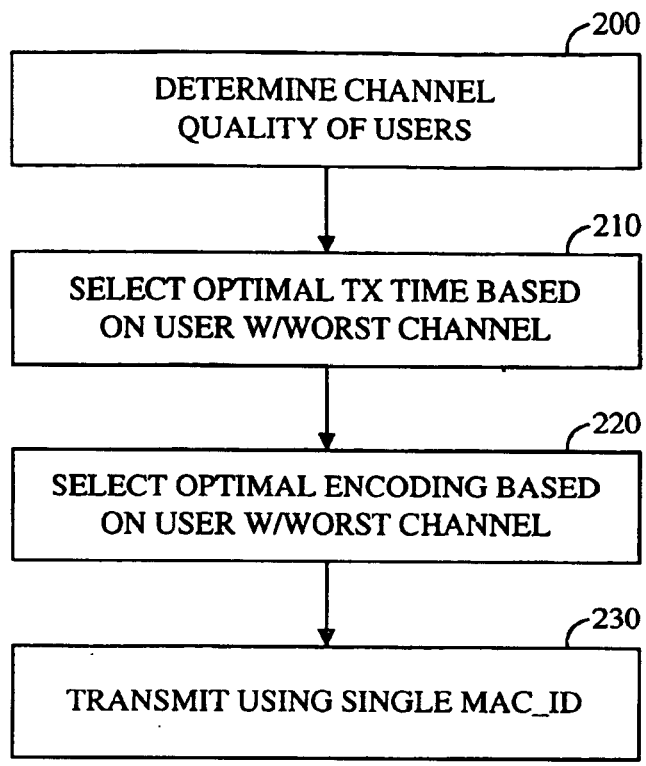
FIG. 2 is a flowchart of an embodiment for selecting the timing of a multi-cast transmission.

Since the MAC_ID identifies only one channel that will be demodulated and decoded by all the subscribing remote stations, embodiments for enabling each remote station in the subscription group to demodulate and decode the channel are also described herein. FIG. 2 is a flowchart for selecting the timing of a multi-cast to M subscribers. At step 200, a scheduling element in a base station determines the channel quality feedback indicators from M subscribers to a multi-cast service. The scheduling element can comprise a memory element and a processing element that is configured to execute the method steps described herein. In one embodiment, measurements of channel interference (C/I) of the forward link common pilot signal serves as channel quality feedback indicators. At step 210, the scheduling element selects an optimal time for transmitting the multi-cast on a channel marked by a special MAC_ID. The optimal time is selected by determining when the subscriber in the worst location has good channel conditions or the transmission delay of the data becomes too large. For example, the channel conditions could be unfavorable for a subscriber who is traveling at extremely high speeds near the base station. The high speed could cause random, but short-lived, deep fades. Such short-lived, deep fades would be an unfavorable channel condition that would decrease the data throughput of the system. At step 220, the base station encodes the multi-cast data in a manner that would allow reception at an acceptable quality level by the subscriber with the worst channel conditions. The base station then scrambles the encoded multi-cast data as necessary with a scrambling code that is known by all subscribers, and transmits it at the selected time on the channel specified by the MAC_ID. At step 230, the base station transmits using the modulation scheme and power level that allow the subscriber with the worst channel conditions to receive the broadcast at an acceptable quality level. An additional refinement to the embodiment is the use of a scrambling code that is common for all subscribers, or common to a select group of subscribers who have paid for extra services.

In one alternative embodiment, rather than using the C/I as the channel quality feedback indicator, the scheduling element determines when the worst location subscriber has good channel conditions by transmitting test data packets to the worst location subscriber until acknowledgement signals arrive from the worst location subscriber. Once acknowledgement signals indicating the successful demodulation and decoding of the test data packet arrives, the scheduling element can commence the multi-cast.

In another alternative embodiment, the scheduling element transmits test data packets to all subscribers and waits for acknowledgement signals from a predetermined percentage of the subscribers. The percentage could be anywhere from a simple majority of the subscribers to 100% of the subscribers. The actual percentage value can be chosen by the serving system. In a system wherein acknowledgement signals are scheduled to arrive at predetermined times, this embodiment can be adjusted so that the multi-cast occurs when at least one designated subscriber has transmitted an acknowledgment signal. The at least one designated subscriber can be chosen so as to maximize the probable receipt of the multi-cast by the majority of the subscribers.

It should be noted that it is unlikely for a subscriber in a good location to not successfully receive the test data packets or the multi-cast. If a base station does not receive an acknowledgment signal from this subscriber, it is more probable that the base station lost the reverse link acknowledgment signal rather than an unsuccessful receipt of the forward link signal by the subscriber. Hence, it is more important to concentrate on acknowledgment signals from the subscribers with poor channels rather than subscribers with favorable channels.

Figure 3:
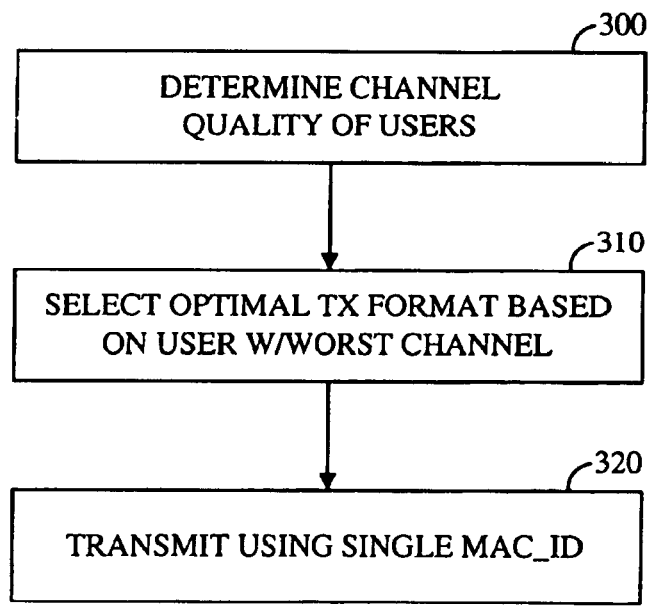
FIG. 3 is a flowchart of an embodiment for selecting the transmission format of a multi-cast transmission.

FIG. 3 is a flowchart for selecting the transmission format of a multi-cast to M subscribers. At step 300, a scheduling element in a base station determines the channel quality feedback indicators from M subscribers to a multi-cast service. Based upon the channel quality feedback indicators, the scheduling element determines the time sensitivity of data and the transmission formats of the data. At step 310, the scheduling element selects a transmission format that will allow the subscriber with the worst channel conditions to recover the original data. At step 320, the base station transmits the multi-cast in the transmission format selected by the scheduling element, wherein the multi-cast is transmitted using a single MAC_ID. It should be noted that the other subscribers would not have difficulties decoding the multi-cast using the selected transmission format since all other subscribers had better channel conditions. As an alternative to using the single MAC_ID, the multi-cast is scrambled by a scrambling code known only to the subscribers.

In addition to the steps described above, the scheduling element could also send re-transmissions in the format designated by the subscriber with the worst channel conditions. Re-transmissions are redundant transmissions of the information, which have already been transmitted. Through the process of "soft-combining" at the receiver, symbols that have been corrupted during the transmission of one packet can be combined with symbols that have been corrupted during the transmission of another packet. Hence, the "good" symbol bits from the separate transmissions can be used together to recover the original data information.

As mentioned before, it is possible to have multiple special MAC_IDs for each possible multi-cast service. It is envisioned that the embodiments described above can allow a service provider to offer multiple multi-cast services, such as news, weather, sports, stock quotes, etc., without sacrificing channel resources that could be otherwise used for voice traffic and dedicated data traffic.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for multi-cast transmissions that minimize channel resources, comprising:

a memory element; and a processing element for executing a set of instructions stored in the memory element, the set of instructions for:

generating an identifier for a group of subscribers, wherein the identifier is for accessing a multi-cast service;

using channel quality information for at least one subscriber to determine the timing of the multi-cast service to the group of subscribers; and transmitting the identifier and the multi-cast service on at least one channel, wherein the multi-cast service is transmitted to each of the subscribers in accordance with the timing determined by the channel quality information.

2. The apparatus of claim 1, wherein transmitting the identifier and the multi-cast service on at least one channel comprises:

transmitting the identifier on a first channel; and transmitting the multi-cast on a second channel.

3. The apparatus of claim 2, wherein the processing element is further for executing instructions for:

scrambling the multi-cast service before transmitting the multi-cast service on the second channel, wherein the scrambling is performed by using a code known only to the group of subscribers.

4. An apparatus of claim 1, wherein the identifier is a Medium Access Control (MAC)_ID.

5. An apparatus for multi-cast transmissions that minimize channel resources, comprising:

a memory element; and a processing element for executing a set of instructions stored in the memory element, the set of instructions for:

generating an identifier for a group of subscribers, wherein the identifier is for accessing a multi-cast service;

choosing channel quality information by selecting the channel quality information associated with the subscribers identified by the identifier and having the worst channel conditions;

determining the timing of the multi-cast service that aflows the subscribers with the worst channel conditions to receive the multicast service with optimal channel quality, wherein the timing is determined based on the channel quality information associated with the subscribers with the worst channel conditions; and transmitting the identifier and the multi-cast service on at least one channel, wherein the multi-cast service is transmitted to each of the subscribers in accordance with the timing determined by the channel quality information.

6. The apparatus of claim 5, wherein the channel quality information is a measurement of channel interference of the forward link common pilot signal.

7. The apparatus of claim 5, wherein the channel quality information is derived from transmission power levels of a base station.

8. The apparatus of claim 5, wherein the channel quality information is a plurality of acknowledgment signals.

9. The apparatus of claim 8, wherein choosing the channel quality of the subscribers with the worst channel conditions comprises:

transmitting a plurality of test data packets to the group of subscribers;

waiting for a plurality of acknowledgment signals from in the group of subscribers in response to the plurality of test data packets; and transmitting the multi-cast service if the plurality of acknowledgment signals indicates a response from a predetermined percentage of the group of subscribers.

10. An apparatus of claim 5, wherein the identifier is a Medium Access Control (MAC)_ID.

11. An apparatus for multi-cast transmissions that minimizes channel resources, comprising:

a memory element; and a processing element for executing a set of instructions stored in the memory element, the set of instruction for:

generating an identifier for a group of subscribers, wherein the identifier is for accessing a multi-cast service;

choosing the channel quality information of the subscriber identified by the identifier and having the worst channel conditions;

determining the timing of the multi-cast service that allows the subscriber with the worst channel condition to receive the multi-cast service with optimal channel quality, wherein the timing is determined based on the channel quality information associated with the subscriber with the worst channel condition; and transmitting the identifier and the multi-cast service on at least one channel, wherein the multi-cast service is transmitted to each of the subscriber in accordance with the timing determined by the channel quality information.

12. The apparatus of claim 11, wherein the channel quality information is an acknowledgment signal from the subscriber with the worst channel condition.

13. An apparatus of claim 11, wherein the identifier is a Medium Access Control (MAC)_ID.

14. An apparatus for multi-cast transmissions that minimizes channel resources, comprising:

a memory element; and a processing element for executing a set of instructions stored in the memory element, the set of instructions for:

generating an identifier for a group of subscribers to a multi-cast service, wherein the identifier is for accessing the multi-cast service;

choosing channel quality information by selecting the channel quality information associated with the subscribers identified by the identifier and having the worst channel conditions; and determining the transmission format of the multi-cast service that allows the subscribers with the worst channel conditions to receive the multicast service with optimal channel quality, wherein the timing is determined based on the channel quality information associated with the subscribers with the worst channel conditions; and transmitting the identifier and the multi-cast service on at least one channel, wherein the multi-cast service is transmitted to each of the subscribers in accordance with the transmission format determined by the channel quality information.

15. The apparatus of claim 14, wherein the channel quality information is a measurement of channel interference of the forward link common pilot signal.

16. The apparatus of claim 14, wherein the channel quality information is derived from transmission power levels of a base station.

17. The apparatus of claim 14, wherein the channel quality information is a plurality of acknowledgment signals.

18. The apparatus of claim 17, wherein choosing the channel quality information of the subscribers with the worst channel conditions comprises:

transmitting a plurality of test data packets to the group of subscribers;

waiting for a plurality of acknowledgment signals from the group of subscribers in response to the plurality of test data packets; and transmitting the multi-cast service if the plurality of acknowledgment signals indicates a response from a predetermined percentage of the group of subscribers.

19. An apparatus of claim 14, where in the multi-cast service is transmitted to each of the subscribers in accordance with a transmission format that is optimal for the subscriber with the worst channel conditions.

20. An apparatus of claim 14, wherein the transmission format includes at least two transmission parameters selected from the group comprising data rate, number of slots, bits per packet, code rate, modulation, symbol repetition and transmission duration.

21. An apparatus of claim 20, wherein at least two of the transmission parameters of the transmission format are adjusted based on the channel quality information.

22. An apparatus of claim 14, wherein the identifier is a Medium Access Control (MAC)_ID.

23. A method for broadcasting to a group of subscribers in a cellular communication network, comprising:
generating an identifier for a group of subscribers, wherein the identifier is for accessing a multi-cast service;
using channel quality information for at least one subscriber to determine the timing of the multi-cast service to the group of subscribers; and
transmitting the identifier and the multi-cast service on at least one channel, wherein the multi-cast service is transmitted to each of the subscribers in accordance with the timing determined by the channel quality information.

24. An apparatus of claim 23, wherein the identifier is a Medium Access Control (MAC)_ID.

25. A method for efficient multi-cast broadcasting, comprising:
generating an identifier for a group of subscribers to a multi-cast service, wherein the identifier is for accessing a multi-cast service;
identifying the subscriber with the worst channel quality by analyzing a plurality of channel quality feedback indicators from a group of subscribers;
selecting a timing and a transmission format of the multi-cast service so that the multi-cast service will be received by the subscriber with the worst channel conditions; and
transmitting the identifier of a first signaling channel and the multi-cast service on a second channel to each of the subscribers in accordance with the timing and the transmission format as determined by the subscriber with the worst channel quality.

26. An apparatus of claim 25, wherein the multi-cast service is transmitted to each of the subscribes in accordance with a transmission format that is optimal for the subscriber with the worst channel conditions.

27. An apparatus of claim 26, wherein the transmission format includes at least two transmission parameters selected from the group comprising data rate, number of slots, bits per packet, code rate, modulation, symbol repetition and transmission duration.

28. An apparatus of claim 27, wherein at least two of the transmission parameters of the transmission format are adjusted based on the channel quality information.

29. An apparatus of claim 25, wherein the identifier is a Medium Access Control (MAC)_ID.

* * * * *